G. O. DEGENER.
COMBINED TYPE WRITING AND COMPUTING MACHINE.
APPLICATION FILED JUNE 6, 1914.

1,276,734.

Patented Aug. 27, 1918.
2 SHEETS—SHEET 1.

WITNESSES:

INVENTOR:
Gustave O. Degener
BY
ATTORNEY.

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,276,734.     Specification of Letters Patent.     Patented Aug. 27, 1918.

Application filed June 6, 1914. Serial No. 843,383.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to a computing machine, and more especially to the totalizer or computing head and the means for locking and driving the computing wheels thereof, with tens-carrying mechanism for transferring complete rotations between adjacent computing wheels and is an improvement on my applications, No. 753,254, filed March 10, 1913, now Patent No. 1,261,107 and No. 775,621, filed June 25, 1913 (now Patent No. 1,270,752).

In my prior applications above mentioned, the computing wheels were driven individually by a master wheel, there being provided a relative step-by-step movement between the computing wheels and the master wheel to effect a *seriatim* registering. The tens-carrying operation was carried on from a separately driven mechanism, which assisted each computing wheel in boosting the next computing wheel one unit when it itself had made a complete revolution.

In the present improvement, the tens-carrying mechanism receives its power from the driving force of the master wheel itself, and there is not provided a separate drive shaft to assist the carrying operation. That is to say, when the master wheel drives any computing wheel through a complete revolution, this computing wheel in turn drives the next computing wheel one step through the tens-carrying mechanism, and so on, which may be assisted by spring dogs having a double action capable of assisting for either addition carrying or subtraction borrowing.

In the present improvement, the tens-carrying mechanism and the master wheel are located out of engagement with the computing wheels, but are brought into engagement therewith at the striking of a numeral key, by the starting mechanism of the computing mechanism. At the bringing into coöperation with the computing wheels of the master wheel and the tens-carrying wheels, a locking mechanism is also brought into play, which prevents a traveling movement of the totalizer relatively to the master wheel, while the master wheel and the tens-carrying wheels are in engagement with the computing wheels. Further, a detent universal to all the computing wheels, which is normally in locking engagement therewith, is moved to an ineffective position, so as to permit the drive of the computing wheels at the instant the tens-carrying wheels and the master wheel are brought into engagement therewith.

The shifting of the tens-carrying mechanism and the master wheel and allied parts, is controlled from the starting mechanism of the computing mechanism, which has been previously set for an automatic action, and will be tripped at the striking of a numeral key to perform the various functions necessary to a computing operation, including this shifting of the master wheel, tens-carrying mechanism, and allied elements.

Other features and advantages will hereinafter appear.

Referring to the drawings—

Referring more particularly to the separate parts as embodied in the form shown in the drawings, numeral keys 1 in addition to operating the type actions of the typewriter (not shown), pull down on links 2, to rock bell cranks 3, to draw on links 4, so as to swing levers 5, to bring locking blades 6 carried thereby to a central locking position. This action also shifts an interponent plunger 7 into the path of a cradle or hammer 8, so that it may be actuated thereby. That is to say, there is one of these actions for each numeral key from "1" to "9", and the interponents 7 are urged in opposition to corresponding ones of a series of index pins 9, provided in an index or valuating wheel 10, so that when the shifted interponent is actuated by the hammer 8, it will set this pin 9 from a position projecting on one side of the computing wheel in unison with most of its fellows, to an isolated projecting position on the opposite side of the computing wheel.

Normally a gap is provided in the series of pins 9, so as to form a mutilated gear thereof, in the interrupted portion of which a spur wheel 11 may rotate idly. This spur wheel 11 is driven from a motor (not shown), through the intermediary of a shaft 12, a clutch 13, and intermeshing bevel gears 14 and 15, the latter of which is secured to a shaft 16 driven from the motor. Normally the motor may not be driving, and the clutch 13 may be open, so that the spur wheel 11 may be silent.

To start the spur wheel 11 in rotation, that is, by energizing the motor and connecting up the clutch 13, there is provided a starting mechanism, indicated in general at 17, which includes a shaft 18, having a pinion 19 secured thereon and meshing with a rack 20 on a bar 21. The bar 21 is normally urged upwardly by a spring or other motive means 22, but is restrained from upward movement by a dog 23, engaging a wheel 24, connected to the shaft 18 by a one-way-acting clutch 25. However, at the striking of any one of the numeral keys, this starting mechanism is tripped by tripping the dog 23, and acts under the tension of the spring 22. To do this, each of the links 4 is provided with a head 26, which engages a universal plate 27, so as to move the same against the tension of a spring 28. This rocks a lever 29, connected to the universal plate 27, which in turn thrusts forward a plunger 30, the latter engaging the dog 23, and tripping the same from engagement with the ratchet wheel 24.

It will be seen then that in addition to setting one of the pins 9 on the index wheel 10, the striking of a numeral key trips the starting mechanism 17, by tripping the dog 23, so that the starting mechanism is free to act under the force of the spring 22. In other words, the shaft 18 is rotated, and withdraws a cam 31 from engagement with a shifting lever 32, so that a spring 33 may close the clutch 13 to which the shifting lever 32 is connected, thereby permitting the spur wheel 11 to be rotated in the gap in the index wheel 10. This gap, however, is filled by unsetting the previously set pin, by means of a lever 34 engaged by the cam 31 during the rotation of the shaft 18. The cradle or hammer 8 is reciprocated by the back-and-fourth rotation of the shaft 18, through a link 35 connected to an arm 36 on the shaft 18.

It has thus been shown how the index wheel may be driven by the spur wheel 11 after the gap has been filled at the spur wheel, until the next gap just formed by the last set pin comes into register with the spur wheel 11, when the index wheel 10 will once more cease to rotate. The extent of this rotation depends upon the particular numeral key 1 actuated, so that the valuating or index wheel 10 determines the extent of computation to correspond with the particular numeral key struck.

This rotation is transmitted by means of a shaft 37, to a bevel gear 38 meshing to drive a bevel gear 39 on a shaft 40, which in turn drives by bevel gears 41 and 41', a vertical shaft 42. The vertical shaft 42 is provided with a pair of oppositely-facing bevel gears 43 and 44, which are loosely mounted thereon, and connectible alternatively in driven relation with the shaft 42 by a clutch 45. The shaft 42 then will drive through the bevel gears 43 and 44, and a meshing bevel gear 46, a master-wheel shaft 47 in one direction or the other, according to which of the gears 43 or 44 is clutched to the shaft 42.

The shaft 47 is the master wheel shaft, and is provided with a master wheel 48 secured thereon, so as to rotate therewith. The master wheel 48 when once moved up to project across the line of pitch of computing wheels 49 (Figs. 3 and 6) may drive these computing wheels individually. Each computing wheel 49 in turn drives an intermediate gear 50, which in turn drives a gear 51 secured to a dial wheel 52, having numbers thereon arranged to be exhibited through a sight opening 53 in a casing 54. This arrangement forms what is known as a computing head or totalizer, and there is a number of the dial wheels 52 corresponding to the number of denominations or digits in the number to be computed.

In order to obtain a step-by-step relative movement between the master wheel and the computing wheels 49, so that the master wheel can drive these computing wheels *seriatim* to correspond with the printing of the numbers by the type-actions actuated by the numeral keys 1, the totalizer or totalizers, if several of them are used, are mounted on an auxiliary carriage 55, which is moved step by step with the typewriter carriage in a manner more clearly shown and described in my application No. 775,621 above mentioned.

In addition to the master wheel 48 meshing with and driving the computing wheels, tens-carrying wheels 56 are provided for meshing with the computing wheels, and carrying a complete revolution from a lower computing wheel to the next higher computing wheel, whether the rotation is in one direction for addition, or in the opposite direction for subtraction.

It will be noted that the tens-carrying wheels 56 and the master wheel 48 are normally out of mesh with the computing wheels 49. Whenever a numeral key 1, however, is struck, the master wheel and the tens-carrying wheels are first brought up into mesh with the computing wheels before the index wheel 10 starts to rotate. For this purpose, the master wheel and the tens-carrying wheels are mounted in a shifting frame 57, which is shifted upwardly from the starting mechanism 17 when the latter comes into play, the cam 31 maintaining the shifting arm 32 in the open position of the clutch 13 until the very last instant of movement of the shaft 18 and of the starting mechanism, so that the shifting of the master wheel and tens-carrying wheels will take place assuredly before the index wheel 10 starts to rotate, and thus before the master wheel 48 starts to drive.

To move the shifting frame 57 and the parts carried thereby up unto the totalizer at a computing zone, the bar 21 has an upward extension 58 on which is provided an auxiliary frame 59 having a rack 60. This rack meshes with a start-and-stop pinion or Geneva gear 61, which has a number of teeth for a portion of its periphery, and a cut-away portion 62 devoid of teeth. Normally, the blank portion of the pinion 61 is in register with the rack 60, so as to be capable of being driven thereby. However, as the bar 21 and its extension 58 and the rack 60 move upwardly, a pin 63 on the rack engages an arm 64 on the pinion 61, and shifts it through a fraction of a revolution, to bring the first tooth thereof into mesh with the teeth of the rack 60. Further upward movement of the bar 21, under the propulsion of the spring 22, will rotate the pinion 61 and its shaft 65. The shaft 65 is provided with a pair of pinions 66 and 67 meshing with a pair of racks 68 and 69 on the shifting frame 57, so as to cause a balanced parallel motion of the frame, maintaining the axis of the master wheel 48 and the tens-carrying wheels 56 always horizontal.

In addition to bringing the tens-carrying wheels and the master wheel into mesh with the computing wheels, the shifting frame 57 locks the totalizer against a traveling movement, so as to prevent any relative travel between the computing wheels and the master wheel or the tens-carrying wheels while a computing operation is going on. For this purpose, a dog 70 is provided on the shifting frame 57, which is arranged to engage between the teeth of a rack 71 carried by each of the totalizers. There is also provided on the shifting frame 57, a trip lug 72, which engages the tail of a spring-pressed detent 73, which detent is universal to all of the computing wheels 49, and normally prevents any rotary movement whatever of these computing wheels while the master wheel and tens-carrying wheels are out of mesh therewith. That is to say, when the shift frame 57 is raised, it brings about an engagement of the master wheel and the tens-carrying wheels with the computing wheels, locks the totalizer against traveling movement, and disengages the detent 73 from all of the computing wheels.

At the end of each computing operation, that is, the runing up of each digit corresponding to the striking of a numeral key, the shift frame 57 is returned to its normal position with the return of the bar 21 to its normal position. This return is accomplished by a resetting of the starting mechanism for the computing mechanism. To do this, an operating member 74 (Fig. 1) is first shifted by one of the index pins 9, to a position such that a hook 75 thereon will engage a latch 76, behind the nose of which it is caught.

At the end of a revolution of the valuating or index wheel 10, the just set pin as it comes to its stationary or home position, will engage an extension 77 of the member 74, and carry it back to its normal position, together with the latch 76. The latch 76 is connected to a shifting lever 78, which shifts a clutch 79, splined on to a shaft 80, so that it engages a clutch 81, loosely mounted on the shaft 80, and drives this clutch, together with a sleeve 82 carried thereby. The sleeve 82 has a cam 83, which engages a follower 84, and swings the same outwardly against the tension of a spring 85, so as to rock a double bell crank lever 86, which has a lost-motion connection 87 with the extension 58. The shaft 80 is driven when the motor is in action, from the shaft 16, by a pair of meshing bevel gears 88 and 89.

It will thus be seen that at the end of a computing operation, the lever 86 is rocked to depress the extension 58, and thus the bar 21, against the tension of the spring 22, retensioning the latter, and returning the shaft 18 to its normal position. The counter-rotation of the shaft 18 will return all of the allied parts connected thereto to their normal positions, breaking the clutch 13, returning the cradle or hammer 8, and also enabling the return of the pin-restorer 34. All this mechanism is more fully described and shown in my co-pending application No. 753,254, above mentioned, to which reference may be had if more complete explanation is desired.

Of course, when the bar 21 and the extension 58 are depressed, the rack 60 will rotate the pinion 61 to rotate the shaft 65, which will depress the shift frame 57, through the intermediary of the gears 66, 67, and the racks 68, 69.

The specific action of the tens-carrying mechanism will now be described. If the master wheel 48 meshing with one of the computing wheels, rotates the latter so that the dial wheel 52 associated therewith passes from "9" to "0" at the sight opening 53, then a special starting tooth 90 on the computing wheel 49 will come into engagement with a broad tooth 91 on the associated carrying wheel 56, so as to shift it out of the normal neutral position shown in Fig. 5. The direction of shift will depend on the direction of rotation of the master wheel, and, hence the character of computing action being carried on, that is, addition or subtraction. If an adding operation is carried on, the shift will be in the direction of movement to the position shown in Fig. 7; if a subtracting operation is carried on, the shift will be in the opposite direction.

It will be noted that at the top of each tens-carrying wheel 56, there are three teeth, one of which is the broad tooth 91, and the others of which are two short teeth 92 and 93. The broad tooth 91 is only driven by the extended portion of the special starting tooth 90 on the lower computing wheel, but it also meshes with and drives any of the teeth on the next higher computing wheel 49, as do the teeth 92 and 93. That is to say, each tens-carrying wheel overlaps two computing wheels by virtue of the broad tooth 91, the broad tooth 91 being driven solely by the special tens-carrying tooth 90, while all three of the teeth 91, 92 and 93 mesh with the teeth of the next higher computing wheel 49.

To assist the tens-carrying wheels 56, and prevent overthrow thereof, there are provided a series of tens-carrying dogs 94, one for each tens-carrying wheel 56. The tens-carrying dog 94 is normally urged by a spring 95 to the position shown in Fig. 7. However, it is, at the same time, restrained from such movement by engaging with a tooth 96 on its associated tens-carrying wheel 56. Still when the tens-carrying wheel 56 is slightly thrown to one side or the other, so as to bring a line of thrust to one side of the dead center line, then the spring 95 will urge the dog 94, so that the cam end 97 thereof will shift the tooth 96 farther along to one side of the dog or the other, as to its initial movement. That is to say, if the tens-carrying wheel is moved slightly to the left in Fig. 5, in an adding operation, the movement would be completed to the Fig. 7 position by the dog 94. If, on the other hand, in a subtracting operation, it is moved slightly in the opposite direction, the movement would be completed to the opposite limit of the movement of the tens-carrying wheel 56. The upper end of the dog 94 is beveled, so that it forms a V-cam elbow engaging either between the teeth 92 and 96, or on the far side of the tooth 96, so as to prevent any accidental movement while the tens-carrying wheel is in mesh with its computing wheel 49, or is being moved out of mesh therewith.

The dog 94 for the tens-carrying wheel next adjacent to the master wheel 48, which is liable to be subjected to a frictional tendency to rotate, is provided with a notch 98 (Fig. 5) to engage the tooth 96 firmly, requiring a positive movement to effect a disengagement.

Figures 1, 2, 3, 4:
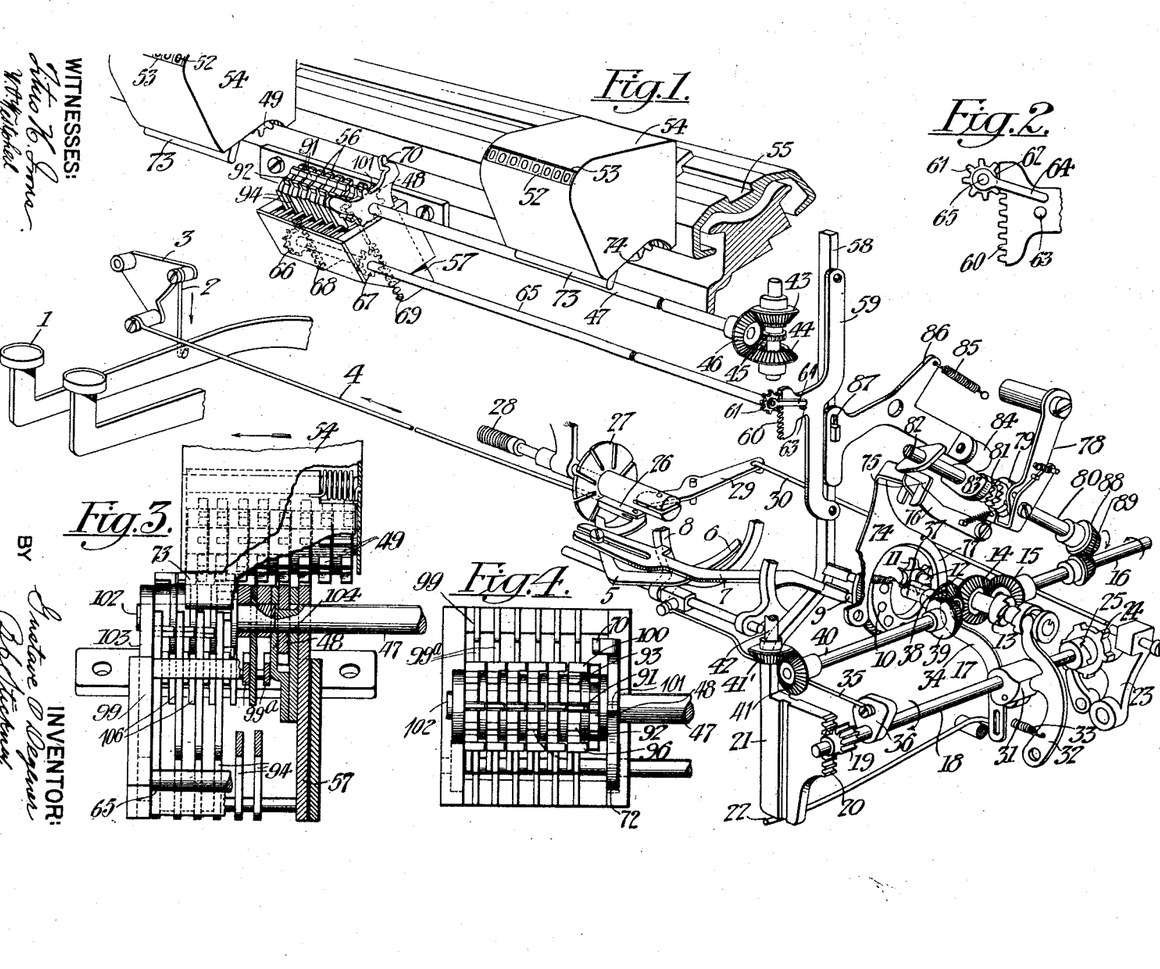
Figure 1 is a skeleton perspective view showing all of the parts in their normal positions, with the numeral keys raised, and with the master wheel and tens-carrying wheels depressed out of engagement with the computing wheels of the computing head or totalizer.
Fig. 2 is a detail view in side elevation, showing the start-and-stop mechanism which brings into play the shifting mechanism for moving the tens-carrying wheels and the master wheel into mesh with the computing wheels. This start-and-stop mechanism is shown in its silent position before having been actuated by the starting mechanism of the computing mechanism. This start-and-stop mechanism also provides a certain amount of lost motion, permitting the tens-carrying mechanism to come to a dead stop when disengaged from the computing wheels, while the resetting mechanism is overset slightly to insure the catching of the mechanism in its set position.
Fig. 3 is a front view in elevation, partly broken away to show the underlying structure of the totalizer or computing head and the master wheel and tens-carrying mechanism therefor, showing the latter in engagement with the computing wheels.
Fig. 4 is a top plan view of the tens-carrying and master wheel shifting frame, with the mechanism carried thereby.
Figures 5, 6, 7, 8, 9, 10, 11:
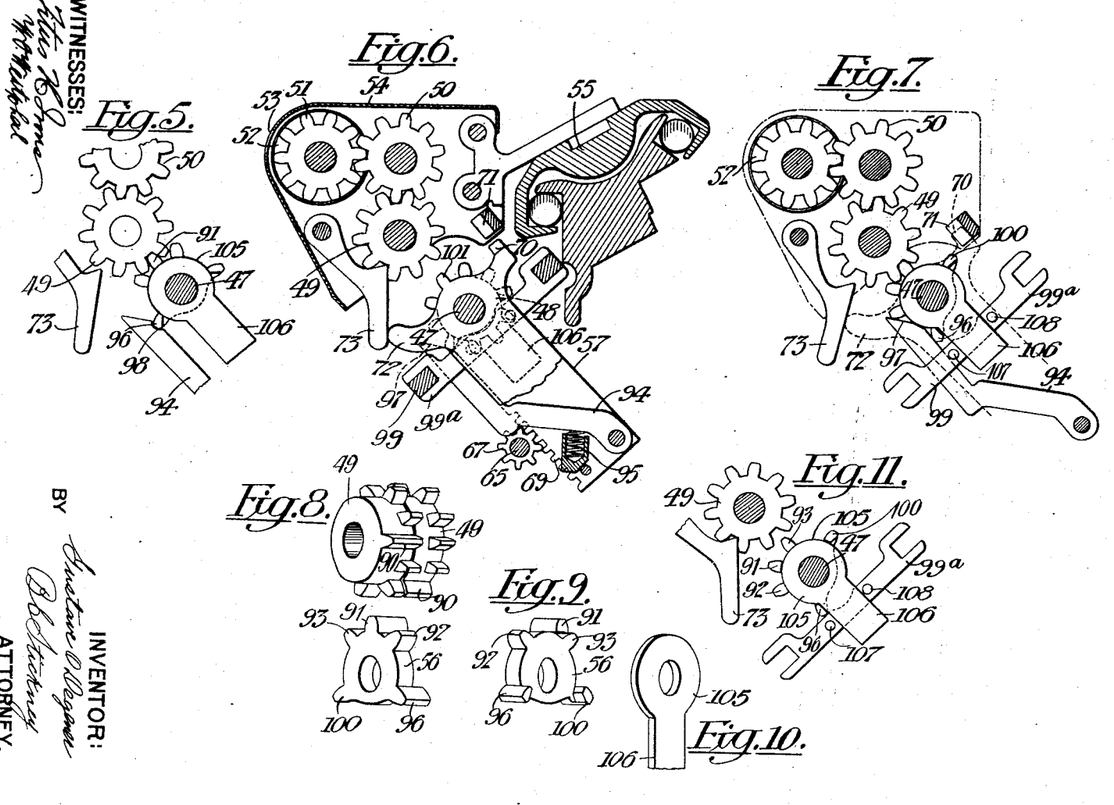
Fig. 5 is a detail view showing one of the tens-carrying wheels in engagement with one of the computing wheels, and with the detent for the computing wheels thrown out of locking engagement therewith. The tens-carrying wheel is shown in its intermediate neutral position before having effected a tens-carrying operation.
Fig. 6 is a vertical section taken from front to rear, through one of the computing heads or totalizers, and the master wheel and tens-carrying mechanism therefor, showing the master wheel and tens-carrying frame in the act of being moved up to bring the master wheel and the tens-carrying wheels into mesh with the computing wheels, and also in the act of disengaging the detent for the computing wheels, and engaging the lock for preventing a traveling movement of the totalizer or computing head.
Fig. 7 is a view of certain of the parts shown in Fig. 6, at a slightly later period when the tens-carrying wheel has actually come into mesh with the computing wheel, and also showing a tens-carrying wheel as having been actuated to carry a unit to the next higher computing wheel.
Fig. 8 is a detail perspective view of a couple of computing wheels, showing the relation of one of the tens-carrying wheels thereto.
Fig. 9 is a detail perspective view of a tens-carrying wheel taken from the opposite side to the view shown in Fig. 8.
Fig. 10 is a detail perspective view showing the hanger for supporting the shaft of the tens-carrying wheel.
Fig. 11 is a detail view, showing the tens-carrying mechanism as being moved out of engagement with its corresponding computing wheel, and in the act of being returned to a normal position subsequent to a tens-carrying operation, so that it will be set and centralized ready for a new tens-carrying operation.

To reset any of the tens-carrying wheels 56 which may have acted either in an adding or a subtracting operation, there is provided a restoring frame 99, which also forms a guiding frame for the shifting frame 57. When the shifting frame 57 returns to its normal depressed position at the end of a computing action, if an adding operation had just taken place with a corresponding tens-carrying action, the tooth 96, which will be in the position shown in Fig. 7, will come into engagement with the associated cross bar 99ᵃ of the restoring frame 99, as illustrated in Figs. 4 and 11, when by a further movement, the tens-carrying wheel 56 will be rotated to a neutral intermediate position, such as that shown in Figs. 5 and 6. On the other hand, if a subtracting operation with an attended tens-carrying ac-action had taken place, the tens-carrying wheel 56 would have been shifted to the opposite limit of its throw, so that another tooth, 100, similar to the tooth 96 only extending on the opposite side of the tens-carrying wheel 56, would come into engagement with the restoring frame 99, and thus enable the camming of the tens-carrying wheel to an intermediate neutral position. This restoring of the tens-carrying wheels to their normal intermediate position, also resets the associated dogs 94 against the tension of the springs 95, and locks them in their set position ready to assist in a subsequent tens-carrying action. In this connection, it will be seen that when the shifting frame 57 has reached the bottom of its stroke, the teeth 96 and 100 will be in positive engagement with the restoring frame 99, which is fixed to the frame of the machine.

Inasmuch as the starting mechanism 17 must be slightly overset to insure the reëngagement of the dog 23 and the parts of the one-way-acting clutch 25, it is necessary to allow for a certain amount of lost motion between the starting mechanism and the shifting frame 57. Hence the need of the start-and-stop mechanism illustrated in Figs. 1 and 2, connecting the shaft 65 with the rack 60.

When the shifting frame 57 reaches the bottom of its stroke, a blank portion of the mutilated pinion 61 comes into register with the rack 60, so that it no longer is driven by the rack, permitting the rack and the bar 21 to move slightly downward, while locking the shaft 65 in its rotated position, and thus locking the shifting frame 57 in its depressed position. On a subsequent operation, the pin 63 will rock the arm 64, and thus bring the pinion 61 once more into mesh with the rack 60, so that while the depressing mechanism for the shifting frame 57 is disconnected before the end of the down stroke of the bar 21, it will be re-connected at the beginning of the up stroke of the bar 21, and thus at the beginning of the action of the starting mechanism 17.

In order to prevent any computing wheel 49, next higher to that one which is being driven by the master wheel, from being moved by friction from the lower computing wheel which is being driven, a special locking tooth 101 is provided on the shifting frame 57, which engages between the teeth of the next computing wheel 49 to that being driven by the master wheel.

In order to prevent the drive of the master wheel and its shaft from being carried to the tens-carrying wheels 56 above the same, the latter are mounted on a separate stub-shaft 102, which is supported in one bearing in a side frame 103, and in a bearing in a bracket 104 (Fig. 3) located intermediate the master wheel 48 and the first tens-carrying wheel 56.

The tens-carrying wheels are separated from each other by shims or collars 105 (Figs. 10 and 11), which prevent rotation being carried from one to the other, and also act to limit the extent of throw of the tens-carrying wheels. For this purpose, each of the shims 105 is provided with a downward extension 106 passing between pins 107 and 108 on the restoring frame 99. The teeth 96 and 100, it will be noted, are broad, so that they project to a position to engage the extension 106 in whichever direction the tens-carrying wheel 56 is rocked, thereby positively limiting the extent of throw of the tens-carrying wheel 56, preventing any overthrow of the carried-to computing wheel.

Summarizing briefly the operation of the machine, when one of the numeral keys 1 is struck, it trips the starting mechanism 17, so that the rack bar 21 and the extension 58 are raised to first bring the pinion 61 into mesh with the rack 60 by the engagement of the pin 63 with the arm 64. The shaft 65 is then rotated to drive the shift frame 57 upwardly, so as to first disengage the universal detent 73 and then lock the totalizer or computing head carriage against traveling movement by the dog 70 and the rack 71. The computing wheel 49 next below the master wheel 48 is also locked against rotation by the detent tooth 101.

The upward movement of the frame 57, in addition to this unlocking and locking, brings the master wheel 48 into mesh with the particular computing wheel corresponding to the printing point, and also brings the tens-carrying wheels 56 into mesh with all computing wheels of higher denomination than the particular computing wheel with which the master wheel engages. By this time the starting mechanism has connected the spur wheel 11, by means of the clutch 13, in driven relation with the motor, so that the index wheel 10 is driven an amount coresponding to the particular numeral key struck. This rotation is transmitted through the gearing to the master wheel shaft 47, which, by the way, is flexible enough and long enough so that the up-and-down swinging movement of the master wheel does not disturb its driving train. The master wheel shaft 47 rotates its master wheel 48 an amount corresponding to the numeral key actuated, which in turn drives the associated computing wheel 49 a similar amount, and the latter drives, through the gearing, the dial wheel 52.

If a number was previously exhibited by its particular dial wheel, say "5" for example, and the "6" key happened to be struck, the dial wheel would pass through zero to show "1." In doing so, it would be necessary to carry "1" to the next higher computing wheel. The tens-carrying wheel 56 in register with the particular computing wheel driven by the master wheel, takes care of this carry over by being shifted a fraction of a revolution by the special tens-carrying tooth 90, which is assisted by the assisting dog 94, so that the next higher computing wheel will be driven one-tenth of a revolution. The direction of carry depends on the direction of rotation of the master wheel. Whichever way the tens-carrying wheel 56 was tilted, it will be held in that position until the computing operation is completed, when the resetting of the starting mechanism will withdraw the shifting frame 57 together with the parts carried thereby, from coöperative engagement with parts of the computing wheel, to spaced relation therefrom.

Among other things, the lock 70 will be disengaged from the rack 71, the locking tooth 100 will be disengaged from the computing wheel 49 below the one being driven by the master wheel, the detent 73 will be permitted to reëngage the computing wheels 49, the master wheel 48 will be withdrawn from engagement with the computing wheel which it is driving, and the tens-carrying wheels 56 will be withdrawn from the computing wheels higher than the computing wheel being driven by the master wheel.

During this engaging movement of the shifting frame 57, such of the tens-carrying wheels 56 as has effected a tens-carrying operation, will have either the tooth 96 or the tooth 100, according to whether the action was adding or subtracting, engage the corresponding cross bars 99ᵃ of the frame 99, and restore such tens-carrying wheels to their normal mid-position ready for a subsequent tens-carrying operation. After the shifting frame 57 has returned to its engaged position, the carriage will space the totalizer or computing head one step to bring the master wheel in spaced register with the next computing wheel, when another numeral key may be struck, and the action repeated as before.

It will be noted that at the end of the disengaging movement, the blank portion 62 of the pinion 61 comes into register with the rack 60, so that the re-setting mechanism can slightly overset the starting mechanism 18, while yet permitting the carrying wheels 56 to come up hard and fast against the cross bars 99ᵃ.

Variations may be resorted to within the scope of the invention, and portions of the improvements may be used without others.

Having thus described my invention, I claim:

1. The combination with a computing wheel, of a normally effective detent for locking said computing wheel against rotation, a power-driven master wheel for driving said computing wheel, being normally out of engagement with said computing wheel, and power-driven means for concomitantly shifting said master wheel by a transaxial movement into engagement with said computing wheel and disengaging said detent from said computing wheel.

2. The combination with a series of computing wheels, of a single detent universal to all of said computing wheels to prevent the accidental rotation thereof, a power-driven master wheel for driving said computing wheels *seriatim*, said master wheel being normally out of engagement with all of said computing wheels, and power-driven shifting means for concomitantly bringing said master wheel into engagement with one of said computing wheels, and shifting said detent out of engagement with all of said computing wheels by a transaxial movement.

3. The combination with a series of coaxial computing wheels, of a power-driven master wheel for driving said computing wheels *seriatim*, a series of reciprocating tens-carrying devices coaxial with said master wheel, coöperating with said master wheel and said computing wheels to effect tens-carrying operation, said master wheel and said tens-carrying devices being normally disengaged from said computing wheels, a detent universal to all of said computing wheels, and power driven shifting means operating to disengage said detent and engage said master wheel with one of said computing wheels, and also engage tens-carrying devices with all computing wheels higher in denomination than the computing wheel with which said master wheel is engaged.

4. The combination with a series of computing wheels, of a master wheel for driving said computing wheels *seriatim*, detent mechanism for all of said computing wheels normally in engagement with said computing wheels to prevent accidental rotation thereof, said master wheel being normally disengaged from all of said computing wheels, and movable transaxially into engagement with each of said computing wheels *seriatim*, a lock for holding against rotation the computing wheel of next lower denomination from that with which the master wheel engages, and shifting means for concomitantly bringing said master wheel into engagement with one of said computing wheels, bringing said lock into engagement with the next lower computing wheel with which the said master wheel engages, and disengaging said detent mechanism from all of said computing wheels, so as to prevent the rotation thereof.

5. The combination with a series of computing wheels, of a master wheel for driving said computing wheels *seriatim*, said master wheel and said computing wheels having a relative step-by-step movement to enable the successive register of said master wheel with each of said computing wheels, locking means for preventing a traveling movement between said master wheel and said computing wheels, detent mechanism for preventing rotation of any of said computing wheels, a lock for the computing wheel next lower to the one in register with the master wheel, and shifting means for simultaneously bringing into play said locking means for preventing a relative traveling movement, for engaging said master wheel with the computing wheel with which it rotates, disengaging said detent mechanism, and for bringing said lock for the computing wheel next lower to the one with which said master wheel engages, into engagement with said computing wheel.

6. The combination with a totalizer including a series of computing wheels, of a rack on said totalizer, a detent universal to all of said computing wheels, a shifting frame, a master wheel carried by said shifting frame, and normally out of engagement with said computing wheels, a locking tooth on said shifting frame, engageable with said rack, a locking tooth on said shifting frame for engaging one of said computing wheels, a disengaging mechanism on said shifting frame for disconnecting said detent from all of said computing wheels, and means for shifting said frame to concomitantly bring said master wheel into engagement with one of said computing wheels, to bring said locking teeth into engagement respectively with said rack and the computing wheel next lower to the one which said master wheel engages, and for tripping said detent to permit a rotation of all of said computing wheels as may be driven.

7. The combination with a totalizer including a series of computing wheels, of a group of elements coöperating with said totalizer, and the parts thereof, to effect a computing operation, said group of elements being normally disengaged from said totalizer, a shifting frame for concomitantly bringing said group of elements into engagement with said totalizer and the parts thereof, said shifting frame including a pair of racks, and means for manipulating said shifting frame and the group of elements carried thereby back and forth, including a pair of gears meshing with said racks and a shaft for driving said gears.

8. The combination with a series of computing wheels, of a master wheel for driving said computing wheels *seriatim*, said master wheel being normally out of engagement with said computing wheels, motor driven shifting means for bringing about an engagement of said master wheel with said computing wheels by a transaxial movement, computing mechanism for controlling the rotation of said master wheel, starting mechanism for said computing mechanism, and connections enabling the actuation of said shifting means by said starting mechanism, to effect the initiation of said transaxial movement between said computing wheels and said master wheel to bring about an engagement of said master wheel with one of said computing wheels before said starting mechanism has actually brought said computing mechanism into play to effect a rotation of said master wheel.

9. The combination with a computing wheel, of a master wheel for driving said computing wheel, said master wheel being normally disengaged from said computing wheel, a motor for driving the master wheel, indexing mechanism for determining the extent of rotation of said master wheel, said indexing mechanism being normally silent, and motor driven starting mechanism for bringing said indexing mechanism into play, acting first to bring about an engagement of said master wheel with said computing wheel.

10. The combination with a computing wheel, of a master wheel for driving said computing wheel, said master wheel being normally disengaged from said computing wheel, a motor for driving the master wheel, indexing mechanism for determining the extent of rotation of said master wheel, said indexing mechanism being normally silent, motor driven starting mechanism set for action and arranged to first bring about an engagement of said master wheel with said computing wheel, and then start said indexing mechanism into action, and numeral keys for controlling the extent of movement of said indexing mechanism according to the value of the key, and arranged to concomitantly trip said set starting mechanism so as to permit the same to act.

11. The combination with a computing wheel, of a master wheel for driving said computing wheel, said master wheel being normally disengaged from said computing wheel, indexing mechanism for determining the extent of rotation of said master wheel, a power-driven shaft for driving said indexing mechanism, said indexing mechanism being normally silent, starting mechanism set for action and arranged to first bring about an engagement of said master wheel with said computing wheel, and then start said indexing mechanism into action, numeral keys for controlling the extent of movement of said indexing mechanism according to the value of the key, and arranged to concomitantly trip said set starting mechanism so as to permit the same to act, and automatic means driven by said power-driven shaft for concomitantly resetting said starting mechanism and disengaging said master wheel from said computing wheel.

12. The combination with a computing wheel, of an actuating wheel for said computing wheel, said actuating wheel and said computing wheel being normally disengaged, valuating mechanism for determining the extent of rotation of said actuating wheel, a power-driven shaft for driving said indexing mechanism, said valuating mechanism being normally silent, normally set starting mechanism arranged to first bring about an engagement of said actuating wheel with said computing wheel, and then bring into play said valuating mechanism, and automatic means driven by said power-driven shaft and controlled from said valuating mechanism at the end of an action thereof, for disengaging said computing wheel and said actuating wheel from each other.

13. The combination with a computing wheel, of an actuating wheel for driving said computing wheel, said computing wheel and said actuating wheel being normally disengaged from each other, a series of numeral keys for controlling the extent of rotation of said actuating wheel to correspond with the numeral key struck, an index wheel subservient to all of said numeral keys and rotating different amounts to correspond with different keys actuated, and connected to rotate said actuating wheel different amounts according to the numeral key struck, a power-driven shaft for driving said index wheel, power-operated shifting means for bringing about an engagement between said computing wheel and said actuating wheel prior to the beginning of a rotation of said index wheel, and automatic means driven by said power-driven shaft and acting at the end of the rotation of said index wheel, to disengage said computing wheel and said actuating wheel from each other.

14. The combination with a series of computing wheels, of power-driven actuating means for said computing wheels normally disengaged therefrom, computing mechanism for determining the extent of action of said actuating means, numeral keys for controlling said computing mechanism, and power-driven normally set means acting automatically to bring about an engagement of said actuating means with said computing wheels at the striking of a numeral key.

15. The combination with a series of computing wheels, of actuating means for said computing wheels normally disengaged therefrom, computing mechanism for determining the extent of action of said actuating means, a power-driven shaft for driving the actuating means, numeral keys for controlling said computing mechanism, and normally set means acting automatically to bring about an engagement of said actuating means with said computing wheels at the striking of a numeral key, and automatic means controlled from said computing mechanism at the end of a computation, to cause said power-driven shaft to reset said first-mentioned automatic means, and disengage said actuating means from said computing wheels.

16. The combination with a series of computing wheels, of a master wheel for driving said computing wheels *seriatim*, reciprocating tens-carrying devices for said computing wheels normally disengaged therefrom and normally occupying central positions, means for driving said master wheel, and antomatic means for bringing said tens-carrying devices into coöperation with said computing wheels just before the initiation of the rotation of said master wheel, and automatically disengaging said tens-carrying devices subsequent to their action from said computing wheels, and for restoring said tens-carrying devices to normal central positions.

17. The combination with a computing head, of a group of elements arranged to coöperate with said computing head to effect the running up of numbers into said computing head, said group of elements being normally disengaged from said computing head and the parts thereof, a power-driven shaft for operating said elements, shifting means for said group of elements for bringing about the engagement and disengagement of said elements with the parts of said computing head, driving means for said shifting means operated by said power-driven shaft, and lost-motion connections between said driving means and said shifting means enabling a continued movement of said driving means after said shifting means has stopped its movement.

18. The combination with a computing head, of a group of elements arranged to co-operate with said computing head, to effect the running up of numbers into said computing head, said group of elements being normally disengaged from said computing head and the parts thereof, shifting means for said group of elements for bringing about the engagement and disengagement of said elements with the parts of said computing head, driving means for said shifting means, an interrupted connection between said driving means and said shifting means for permitting the continued movement of said driving means after said shifting means has stopped its movement, and a start-and-stop mechanism for reconnecting said driving means with said shifting means at a subsequent action of said driving means, to operate said shifting means.

19. The combination with a computing head, of a group of elements normally disengaged from said computing head but arranged to be engaged with the parts of said computing head to run up numbers therein, a shifting frame for said group of elements, traversing means for said shifting frame including a shaft, a mutilated gear on said shaft, a rack engaging with said mutilated gear to drive the same up to the mutilated portion thereof, an arm connected to said gear, and a pin on said rack engaging said arm to insure the meshing of said gear with said rack when the mutilated portion of said gear is in register with said rack.

20. The combination with a computing head, of a group of elements normally disengaged from said computing head, but arranged to be engaged with the parts of said computing head to run up numbers therein, a power-drive for said elements, shifting means for said group of elements driven by said power-drive, starting means normally set and arranged to actuate said shifting means to bring about an engagement of said group of elements with said computing head, automatic means driven by said power-drive for resetting said starting means after an action thereof, and for disengaging said group of elements from said computing head, and connections between said starting means and said shifting means including a start-and-stop mechanism, to enable an overset of said starting means after said shifting means has disengaged said group of elements from said computing head.

21. The combination with a series of computing wheels, each having a special tens-carrying tooth thereon, of tens-carrying wheels for said computing wheels, having a broad tooth to overlap two adjacent computing wheels, and arranged to be engaged by the tens-carrying tooth on the lower computing wheel, said tens-carrying wheels each having two teeth arranged on opposite sides of said broad tooth, to co-operate therewith in transmitting a movement of a lower computing wheel to the next higher computing wheel, said tens-carrying wheels being normally disengaged from said computing wheels and occupying an intermediate neutral position, and means acting at the disengagement of said tens-carrying wheels from said computing wheels after a tens-carrying operation, to centralize any of said tens-carrying wheels as have moved from a normal intermediate position in a tens-carrying operation, to normal position thereof, by the disengaging movement of said tens-carrying wheels.

22. The combination with a pair of adjacent computing wheels of succeeding denominations, each having a series of teeth therearound, and the computing wheel of lower denomination having a broad tens-carrying tooth, of a tens-carrying wheel having a broad tooth to overlap the broad tooth of the lower computing wheel and the teeth of the higher computing wheel, so as to effect a partial rotation of the higher computing wheel when the lower computing wheel has made a complete rotation, said tens-carrying wheel being normally disengaged from said computing wheels, but shiftable into and out of engagement therewith before and after the tens-carrying operation, said tens-carrying wheel also normally occupying a central neutral position before a tens-carrying operation, and moving to an eccentric position in effecting a tens-carrying, a fixed abutment, and means on said tens-carrying wheel engaging said fixed abutment on the disengagement of said tens-carrying wheel from said computing wheels, to re-centralize said tens-carrying wheel for a subsequent tens-carrying operation.

23. The combination with a pair of adjacent computing wheels of succeeding denominations, each having a series of teeth therearound, and the computing wheel of lower denomination having a broad tens-carrying tooth, of a tens-carrying wheel having a broad tooth to overlap the broad tooth of the lower computing wheel and the teeth of the higher computing wheel, so as to effect a partial rotation of the higher computing wheel when the lower computing wheel has made a complete rotation, said tens-carrying wheel being normally disengaged from said computing wheels but shiftable into and out of engagement therewith before and after the tens-carrying operation, said tens-carrying wheel also normally occupying a central neutral position before a tens-carrying operation, and moving to an eccentric position to one side or the other of its neutral position according to the direction of rotation of the lower computing wheel, so as to effect a tens carrying or borrowing of the higher computing wheel when the lower computing wheel makes a complete revolution, said tens-carrying wheel having a pair of teeth projecting from opposite sides thereof, and a fixed abutment lying in the path of said last-mentioned teeth, so as to re-centralize said tens-carrying wheel from either position of offset as the latter moves to a disengaged position from said computing wheels.

24. The combination with a pair of adjacent computing wheels of succeeding denominations, each having a series of teeth therearound, and the computing wheel of lower denomination having a broad tens-carrying tooth, of a tens-carrying wheel having a broad tooth to overlap the broad tooth of the lower computing wheel and the teeth of the higher computing wheel, so as to effect a partial rotation of the higher computing wheel when the lower computing wheel has made a complete rotation, said tens-carrying wheel being normally disengaged from said computing wheels, but shiftable into and out of engagement therewith before and after the tens-carrying operation, said tens-carrying wheel also normally occupying a central neutral position before a tens-carrying operation, and moving to an eccentric position to one side of its normal neutral position, to effect a tens-carrying operation, and an assisting dog for automatically assisting a movement of said tens-carrying wheel initiated by the lower computing wheel, said assisting dog being normally held from action by said tens-carrying wheel itself.

25. The combination with a pair of adjacent computing wheels of succeeding denominations, each having a series of teeth therearound, and the computing wheel of lower denomination having a broad tens-carrying tooth, of a tens-carrying wheel having a broad tooth to overlap the broad tooth of the lower computing wheel and the teeth of the higher computing wheel, so as to effect a partial rotation of the higher computing wheel when the lower computing wheel has made a complete rotation, said tens-carrying wheel being normally disengaged from said computing wheels but shiftable into and out of engagement therewith before and after the tens-carrying operation, said tens-carrying wheel also normally occupying a central neutral position before a tens-carrying operation, and moving to an eccentric position to one side of its normal neutral position to effect a tens-carrying operation, and an assisting dog for automatically assisting a movement of said tens-carrying wheel initiated by the lower computing wheel, said tens-carrying wheel having a tooth engaging said assisting dog to form a dead center lock preventing the action of said assisting dog until said tens-carrying wheel has been started in its movement to withdraw such tooth from its obstructing position with respect to said assisting dog.

26. The combination with a pair of adjacent computing wheels of succeeding denominations, of a tens-carrying wheel overlapping both computing wheels to effect a drive of the higher computing wheel when the lower computing wheel makes a complete revolution, said tens-carrying wheel being normally disengaged from said computing wheels but movable into engagement therewith, said lower computing wheel having a tens-carrying tooth for starting a movement of said tens-carrying wheel in one direction or the other according to the direction of its own rotation, and an assisting dog normally tending to rotate said tens-carrying wheel, and acting to complete the movement of said tens-carrying wheel in one direction or the other according to the initial movement of said tens-carrying wheel.

27. The combination with a pair of adjacent computing wheels of succeeding denominations, of a tens-carrying wheel overlapping both computing wheels to effect a drive of the higher computing wheel when the lower computing wheel makes a complete revolution, said tens-carrying wheel being normally disengaged from said computing wheels but movable into engagement therewith, said lower computing wheel having a tens-carrying tooth for starting a movement of said tens-carrying wheel in one direction or the other according to the direction of its own rotation, an assisting dog normally tending to rotate said tens-carrying-wheel, and acting to complete the movement of said tens-carrying wheel in one direction or the other according to the initial movement of said tens-carrying wheel, and a fixed abutment engaged by said tens-carrying wheel on disengaging said computing wheels to recentralize said tens-carrying wheel to a normal neutral position after a tens-carrying operation, and also acting to reset said assisting dog to a position tending to act.

28. A tens-carrying wheel having three broad teeth triangularly disposed with respect to each other, and two narrow teeth grouped with one of said broad teeth and spaced apart from the other two of said broad teeth.

29. A tens-carrying wheel having three broad teeth arranged at the apexes of an equilateral triangle, and two narrow teeth, one arranged on each side of one of said broad teeth.

30. A tens-carrying wheel having five teeth arranged in a group of three teeth spaced on either side by mutilated portions from each of the two remaining teeth, which in turn are spaced apart from each other by a mutilated portion.

31. The combination with a series of computing wheels, of a series of tens-carrying wheels for said computing wheels, said tens-carrying wheels having an oscillatory movement, and a series of shims interposed between said tens-carrying wheels to space them apart and each having an extension, each of said tens-carrying wheels having projections engaging on opposite sides of the extensions of said shims to limit the oscillatory movement of said tens-carrying wheels.

32. The combination with a series of computing wheels, of tens-carrying wheels for said computing wheels, said tens-carrying wheels having an oscillatory movement, each of said tens-carrying wheels having a pair of projecting broad teeth, and obstructions lying between said broad teeth on each tens-carrying wheel to limit the oscillatory movement thereof.

33. The combination with a series of computing wheels, of a series of tens-carrying wheels for said computing wheels, said tens-carrying wheels having an oscillatory movement, a series of shims interposed between said tens-carrying wheels to space them apart, and each having an extension, each of said tens-carrying wheels having projections engaging the opposite sides of the extensions of said shims to limit the oscillatory movement of said tens-carrying wheels, and abutments lying in the path of disengaging movement of said tens-carrying wheels to re-centralize said tens-carrying wheels after an oscillatory movement.

34. The combination with a pair of adjacent computing wheels, of a tens-carrying wheel overlapping said computing wheels, to effect a transfer of the movement of the lower computing wheel to the higher computing wheel, said tens-carrying wheel normally occupying an intermediate neutral position, and being normally disengaged from said computing wheels, a dog normally tending to assist a movement of said tens-carrying wheel, being locked by said tens-carrying wheel against action while said tens-carrying wheel occupies a normal neutral position, and means lying in the path of tens-carrying movement of said tens-carrying wheel for limiting the movement thereof under the assisting action of said dog, after said tens-carrying wheel has been started in a tens-carrying operation.

35. The combination with a pair of adjacent computing wheels, of a tens-carrying wheel overlapping said computing wheels, to effect a transfer of the movement of the lower computing wheel to the higher computing wheel, said tens-carrying wheel normally occupying an intermediate neutral position and being normally disengaged from said computing wheels, a dog normally tending to assist a movement of said tens-carrying wheel, being locked by said tens-carrying wheel against action while said tens-carrying wheel occupies a normal neutral position, means lying in the path of tens-carrying movement of said tens-carrying wheel for limiting the movement thereof under the assisting action of said dog after said tens-carrying wheel has been started in a tens-carrying operation, and an abutment coöperating with said tens-carrying wheel during a disengaging movement of said tens-carrying wheel from said computing wheels, acting to return said tens-carrying wheel to a normal neutral position, and reset said assisting dog to its passive potential position.

36. The combination with computing wheels and a master wheel for operating them *seriatim*, of a traveling typewriter carriage for causing relative traveling movement between said computing wheels and said master wheel, positive connections from said carriage for causing said movement, said master wheel normally out of mesh with said computing wheels, typewriter numeral keys, key-controlled power means for moving said master wheel radially into mesh with the one of said computing wheels selected by the typewriter carriage, on the actuation of any one of said keys, and power means whereby the master wheel turns said computing wheel after such meshing and is again moved radially out of mesh with said computing wheel.

37. The combination with computing wheels and a master wheel for operating them *seriatim*, of a traveling typewriter carriage for causing relative traveling movement between said computing wheels and said master wheel, positive connections from said carriage for causing said movement, said master wheel normally out of mesh with said computing wheels, typewriter numeral keys, means for moving said master wheel radially into mesh with the one of said computing wheels selected by the typewriter carriage, means whereby the master wheel turns said computing wheel after such meshing and is again moved radially out of mesh with said computing wheel, a motor for moving and driving said master wheel, and means controlled by the numeral keys for determining how said motor shall operate.

38. The combination with computing wheels and a master wheel for operating them *seriatim*, of a traveling typewriter carriage for causing relative traveling movement between said computing wheels and said master wheel, typewriter numeral keys controlling said carriage and master wheel, positive connections from said carriage for causing said movement, said master wheel normally out of mesh with said computing wheels and movable radially into and out of mesh with the one of the computing wheels selected by the typewriter carriage, means whereby the master wheel turns said computing wheel after such meshing, reciprocating carry-over devices to mesh with said computing wheels, said carry-over devices normally occupying central position, and means for moving said master wheel into and out of mesh with its associated computing wheel and concomitantly moving said carry-over devices into and out of mesh with said computing wheels, and restoring said carry-over devices to normal central positions.

39. The combination with computing wheels and a master wheel for operating them *seriatim*, of a traveling typewriter carriage for causing relative traveling movement between said computing wheels and said master wheel, carry-over devices for said computing wheels, said master wheel and said carry-over devices normally out of mesh with said computing wheels, typewriter numeral keys for determining how said master wheel shall operate, a motor, means controlled from said motor for moving said master wheel radially into mesh with the one of said computing wheels selected by the typewriter carriage and concomitantly moving said carry-over devices into mesh with the computing wheels, and motor-driven means whereby the master wheel turns said computing wheel after such meshing and is again moved radially out of mesh with said computing wheel.

40. The combination with computing wheels and a master wheel for operating them *seriatim*, of a traveling typewriter carriage for causing relative traveling movement between said computing wheels and said master wheel, carry-over devices for said computing wheels, said master wheel and said carry-over devices normally out of mesh with said computing wheels, typewriter numeral keys for determining how said master wheel shall operate, a motor for operating the master wheel, motor-driven means for moving said master wheel radially into mesh with the one of said computing wheels selected by the typewriter carriage and concomitantly moving said carry-over devices into mesh with the computing wheels, means whereby the master wheel turns said computing wheel after such meshing and whereby said master wheel and said carry-over devices move concomitantly out of mesh with the computing wheels, and power means for driving said carry-over devices to complete their movement independently of the power applied to them through the master wheel.

41. The combination with computing wheels and a master wheel for operating them *seriatim*, of a traveling carriage for causing relative movement between said computing wheels and said master wheel, carry-over devices for said computing wheels, said master wheel and said carry-over devices normally out of mesh with said computing wheels, typewriter numeral keys for determining how said master wheel shall operate, a motor, means controlled by said motor for moving said master wheel radially into mash with the one of said computing wheels selected by the typewriter carriage and concomitantly moving said carry-over devices into mesh with the computing wheels, motor-driven means whereby the master wheel turns said computing wheel after such meshing and is again moved radially out of mesh with said computing wheels, and power means for driving said carry-over devices to complete their movement independently of the power applied to them through the master wheel.

42. The combination with computing wheels and a master wheel for engaging them *seriatim*, of a traveling typewriter carriage positively controlling said *seriatim* engagement, said master wheel being normally out of mesh with said computing wheels, numeral keys forming part of said typewriter, means dependent upon the actuation of the numeral key to effect computation for moving said master wheel radially into mesh with the computing wheel selected at the moment by the typewriter carriage, and a motor controlled by said numeral keys for moving and operating said master wheel.

43. The combination with computing wheels and a master wheel for engaging them *seriatim*, of a traveling typewriter carriage positively controlling said *seriatim* engagement, said master wheel being normally out of mesh with said computing wheels, numeral keys forming part of said typewriter, means dependent upon the actuation of a numeral key to effect computation for moving said master wheel radially into mesh with the computing wheel selected at the moment by the typewriter carriage, carry-over devices for said computing wheels associated with said master wheel, connections whereby the carry-over devices mesh with the computing wheels simultaneously with the master wheel, and a motor controlled by said numeral keys for moving and operating said master wheel.

44. The combination with computing wheels and a master wheel normally out of mesh therewith, of a traveling typewriter carriage for positively effecting *seriatim* movement between said master wheel and said computing wheels, a frame normally holding said master wheel out of mesh with said computing wheels, a lock for said carriage forming part of said frame, means for moving said frame to carry said master wheel into mesh with a computing wheel and simultaneously lock said carriage, carry-over devices for said computing wheels carried in said frame, and means whereby said carry-over devices are driven, during a portion of their movement, independently of the turning of the master wheel.

45. In a computing machine, the combination with computing wheels and carry-over devices therefor, normally out of mesh with said computing wheels, of a master wheel for turning said computing wheels, power means for driving said carry-over devices to complete their movement independently of the turning of said master wheel, normally tensioned springs furnishing said power, and means for resetting all said springs released from tension by a carry-over every time the carry-over devices mesh with the computing wheels.

46. In a computing machine, the combination with computing wheels and a master wheel normally out of mesh with said computing wheels, of a traveling typewriter carriage, a long and flexible shaft for said master wheel, adapted to permit said master wheel to normally stand clear of the computing wheels, numeral keys, and connections whereby a numeral key when depressed, first effects movement of the master wheel into mesh with the computing wheels, and then is effective on said master wheel to turn any computing wheel.

47. In a typewriting machine, the combination with a traveling typewriter carriage and typewriter numeral keys, of computing wheels, a master wheel for driving said computing wheels normally out of mesh with said wheels, a motor for moving and driving said master wheel, a trip operated by any numeral key, an interponent for each numeral key, and means whereby when any key sets its interponent and said trip, the motor both times and effects a complete computing operation.

48. The combination with computing wheels and a master wheel therefor, of a motor means whereby said master wheel is normally axially out of mesh with said computing wheels, numeral keys, a single motor-driven member controlled by said numeral keys, and means controlled from said member for moving said master wheel axially into mesh with a computing wheel and then controlling the turning of said master wheel.

GUSTAVE O. DEGENER.

Witnesses:
E. SAUNDERS,
W. O. WESTPHAL.

Copies of this patent may be obtained for five cents each, by addressing the "Commissioner of Patents, Washington, D. C."